R. LUND & T. F. HIND.
NUT BURSTING OR CRACKING MACHINE.
APPLICATION FILED APR. 7, 1915.
1,165,107.
Patented Dec. 21, 1915
2 SHEETS—SHEET 1.
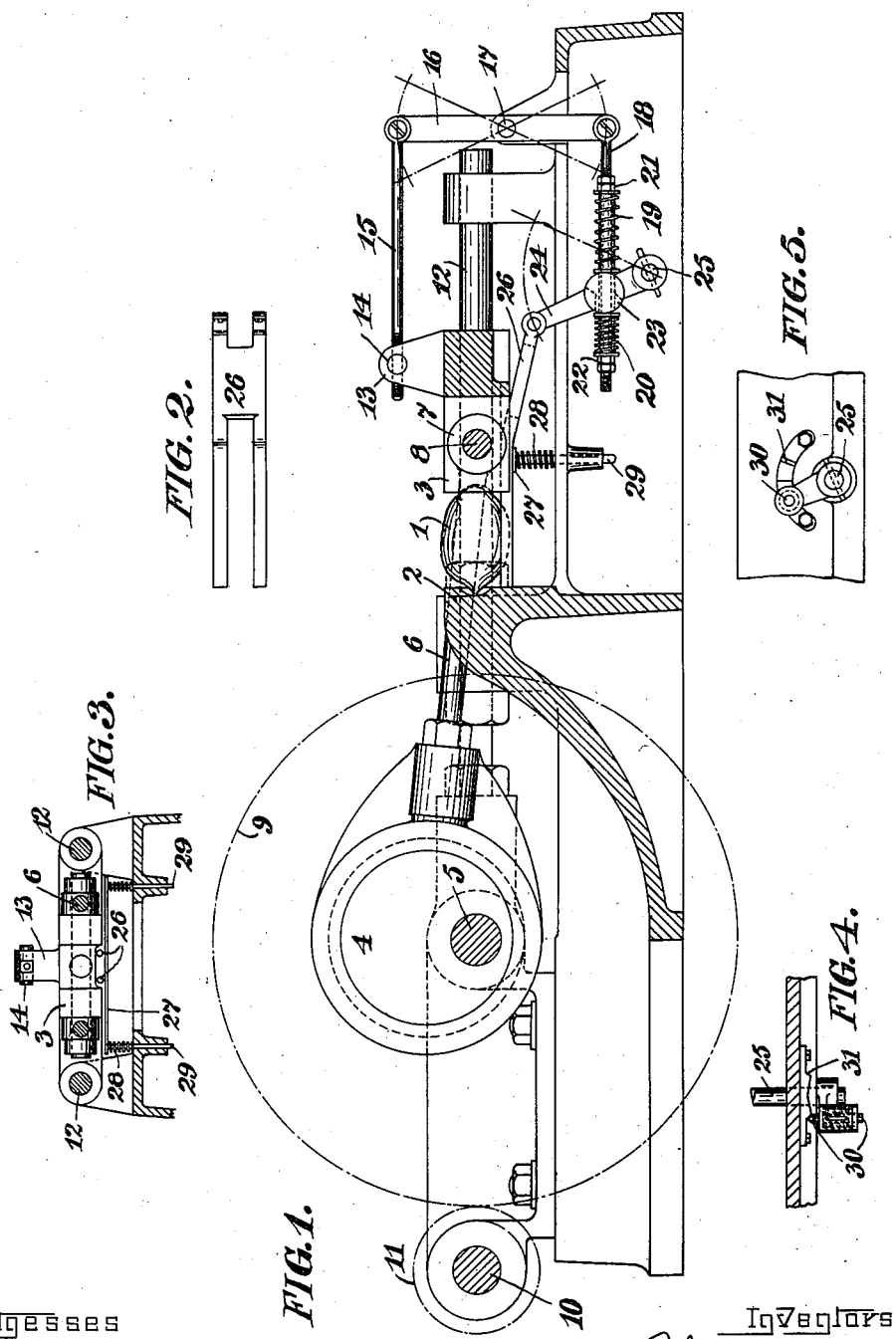
Witnesses
Inventors
Robert Lund
Thomas F. Hind R. LUND & T. F. HIND.
NUT BURSTING OR CRACKING MACHINE.
APPLICATION FILED APR. 7, 1915.

1,165,107.

Patented Dec. 21, 1915.
2 SHEETS—SHEET 2.

UNITED STATES PATENT OFFICE.

ROBERT LUND AND THOMAS FREDERICK HIND, OF PRESTON, ENGLAND.

NUT BURSTING OR CRACKING MACHINE.

1,165,107.  Specification of Letters Patent.  Patented Dec. 21, 1915.

Application filed April 7, 1915. Serial No. 19,839.

*To all whom it may concern:*

Be it known that we, ROBERT LUND and THOMAS FREDERICK HIND, subjects of the King of Great Britain, residing at Preston, in the county of Lancaster, in the Kingdom of England, have invented certain new and useful Improvements in Nut Bursting or Cracking Machines, of which the following is a specification.

This invention relates to apparatus for bursting, cracking or splitting cocoa nuts, cohune nuts and nuts of similar nature to enable the oil bearing kernels to be extracted with the least possible waste.

In order to carry out the purpose of this invention it is necessary to burst, crack or split the nuts by applying the pressure or blow at the ends longitudinally, *i. e.* at the point and root of the nut simultaneously.

Figure 6:
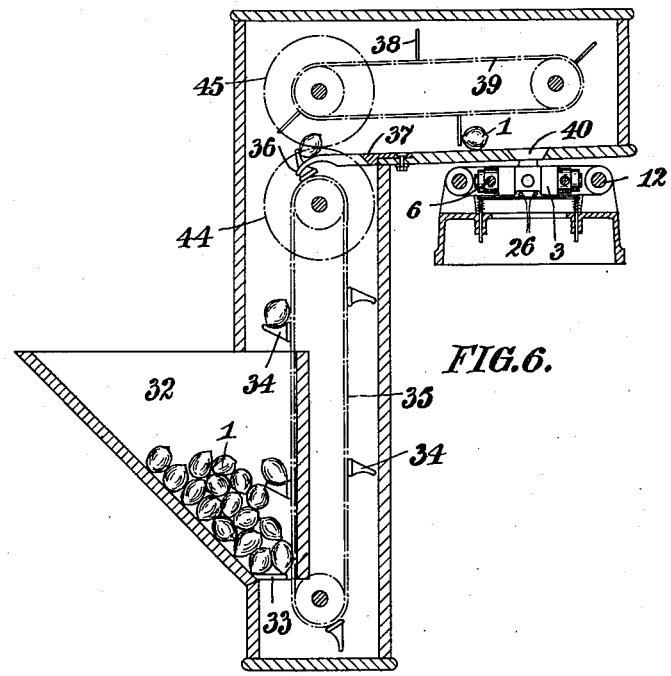

This invention will be described with reference to the accompanying drawings, in which, Figure 1 is a longitudinal section and elevation partly in section of machine; Fig. 2 is a plan of the platform; Fig. 3 is a vertical section on a reduced scale transverse to Fig. 1, taken between the cracking jaws; Fig. 4 is a transverse sectional plan; Fig. 5 a side elevation of retarding mechanism; Fig. 6 a vertical section; and Fig. 7 plan partly in section of the feeding mechanism.

Referring first to Figs. 1 to 5, in these (1) is a nut placed in position between the bursting jaws (2) and (3) each of which is slightly hollowed out so as to safely hold the nose or rounded parts of the nut. (4) are two eccentrics on the main shaft (5) having eccentric rods (6) and an eye (7) holding on to the pin (8) of the cross head or block (3). The main shaft (5) can be driven direct or by a spur wheel (9) from driving shaft and pinion (10) and (11) respectively. The cross head block (3) slides on rods (12), and has a lug or projection (13). In this projection (13) is a pin (14) in which is screwed the rod (15). The rod (15) is linked to the link (16) as shown. Link (16) is pivoted at (17) to the frame and at the lower end to the rod (18). On this rod are two coiled springs (19) and (20) between adjusting set nuts and washers (21) and (22), and between the two springs are two washers and the rounded bulge (23) of a link (24). This link pivots on shaft (25) and at the other end has pivoted to it the platform (26). This platform is shown best in plan in Fig. 2. It is slightly bent in the center, and is carried on a cross plate (27) shown best in Fig. 3, which is supported by a couple of springs (28) surrounding spindles (29). On shaft (25) there is mounted a second lever carrying a spring pin (30) which is pressed down against the side of the frame, and on the side of the frame are two projections (31) which the pin when pressed can slide over by compressing its spring, but which form some resistance to the spring going back. In our original English patent, the pin passed into two projections on a flat spring fastened at each end to the frame, but we have since found that this plan of having the spring on the pin instead of on the frame and pressing against a solid projection instead of against the side of a hollow or hole in the spring makes the best arrangement.

Figure 7:
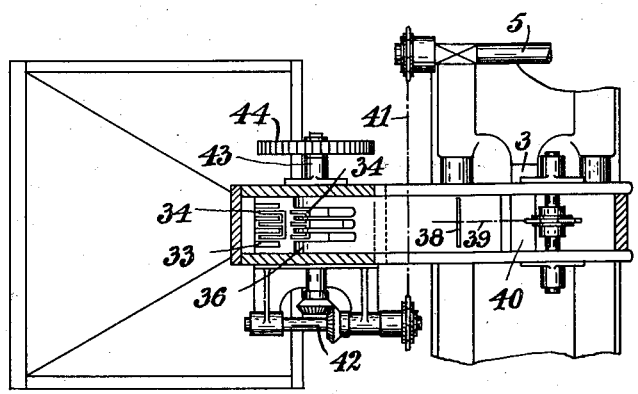

Referring now to Figs. 6 and 7, in these (32) is a hopper to contain the nuts. It has a perforated bottom (33) arranged so that the lifting forks (34) hereafter described can pass freely through the perforations in the bottom, but the nuts being much larger, cannot. (34) are elevator forks on an endless chain (35). These forks lifting the nuts in succession pass them up till they meet projecting fingers (36). The forks (34) pass through between the projecting fingers and press the nuts into the box (37) until they are met by the plates (38) of a traveling band (39) which push them into the slot (40), from whence they fall on to the platform (26), and placed by hand while on this platform so that their terminal noses shall fall into the hollows of the jaws (2) and (3). These traveling bands are driven from the main shaft (5) by sprocket gear (41) driving the shaft (42). This drives the shaft (43) which in turn carries the pulleys of the band (35) and also carries the spur wheel (44) which gears into spur wheel (45) which drives the conveyer (39).

The mode of action is as follows:—The nuts (1) are placed successively between the two jaws (2) and (3). The driving shaft (5) is turned one revolution, the eccentrics bring the jaw (3) up on jaw (2), crushing the nut. The jaw (3) is now drawn backward by the rod (15) and at the same time the platform (26) is drawn back by the link (24). The crushed nut having nothing to support it now falls, and is taken away. The platform passes back, a second nut is put in position, and the action is repeated.

It will be noticed that when the jaw (3) approaches jaw (2) there is a great strain brought by the spring (20) on lever (24), but the pin of this lever has already passed over the projection. When however the spring (20) is compressed solid through the continued march forward of block (3), the spring forces the lever over the projection or notch, and the lever flies back, thus taking all support from under the nut, and when in turn the jaw (3) goes back the crushed nut falls out. In the meantime the pin of lever (24) has passed the second notch or projection, and is held tight until near the end of the stroke when spring (19) in turn becomes compressed solid and forces the pin over the step or depression, and the platform flies into its original position.

We declare that what we claim is:—

1. An apparatus for cracking cohune nuts and the like, consisting of two jaws hollowed opposite each other, to hold the ends of the cohune nuts, mechanism for drawing the jaws apart, and mechanism connected with the crushing mechanism for withdrawing the support as the nut is crushed, and of instantly replacing it, when the nut has had time to fall out.

2. In apparatus for crushing cohune nuts, the combination of two jaws, each hollowed to hold the end of a nut, means for reciprocating one of these toward or away from the other, a supporting platform for the nut and mechanism positively connected with the crushing mechanism, whereby about the time when the nut is crushed, the platform is instantly taken away, and is similarly replaced when the movable jaw is near the extremity of its rearward travel.

3. In apparatus for crushing cohune nuts, the combination of two jaws, each hollowed to hold the end of a nut, means for reciprocating them relatively toward and away from each other, a supporting platform for the nut, mechanism whereby about the time the nut is crushed the platform is taken away, whereby the crushed nut can fall, and means for replacing the platform when the jaws are near the extremity of their rearward travel ready to support a fresh nut, and means for bringing a nut into position with its ends under the hollows of the jaw.

4. In machinery for crushing cohune nuts, the combination of a movable platform for the nut to rest on, two compression jaws shaped to hold the ends of the cohune nut, means for reciprocating one of the jaws to and from the other, and link motion connecting the movable jaw with the platform, and having springs and friction stops, whereby when the movable jaw has receded the required distance, the platform is immediately brought into position to support a nut and when the jaw has arrived about the point where it crushes the nut, the platform is immediately withdrawn from under the nut.

5. In machinery for crushing cohune nuts in which there are two compression jaws, and means for reciprocating one of them, a platform for supporting the nut and link motion connecting the same with the movable jaw, compression springs and friction catches whereby when the link motion presses the platform back beyond the friction catch, the spring instantly moves the platform clear of the nut until it is caught by the other friction clutch and near the end of the rearward stroke the platform is suddenly brought back into position for another nut.

6. In apparatus for crushing cohune nuts and the like, the combination with a nut crushing device of a platform, a link actuating that platform, link motion moving the aforesaid link, and thus the platform in the opposite direction to the movement of the jaw, and impediments which hold the link at each end of its motion until the jaws have moved some little distance, and springs which previously pressed nearly solid by the link motion come into play and drive the platform to the other end of its stroke.

In witness whereof, we have hereunto signed our names this 20th day of March, 1915, in the presence of two subscribing witnesses.

ROBERT LUND.
THOMAS FREDERICK HIND.

Witnesses:
JAMES HASLAW,
ARTHUR WILKINSON.